(12) United States Patent
Sandfort et al.

(10) Patent No.: US 7,148,986 B2
(45) Date of Patent: Dec. 12, 2006

(54) SYSTEM AND METHOD FOR TRACKING PRINT SYSTEM UTILIZATION

(75) Inventors: Patrick O'Neil Sandfort, Tucson, AZ (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 810 days.

(21) Appl. No.: 10/274,307

(22) Filed: Oct. 18, 2002

(65) Prior Publication Data

US 2004/0078425 A1    Apr. 22, 2004

(51) Int. Cl.
*G06F 3/12*    (2006.01)
*G06F 15/00*    (2006.01)

(52) U.S. Cl. ..................... 358/1.15; 709/203
(58) Field of Classification Search ............... 358/1.15; 709/203, 224
See application file for complete search history.

(56) References Cited

U.S. PATENT DOCUMENTS

| 5,699,493 | A | | 12/1997 | Davidson, Jr. et al. |
|---|---|---|---|---|
| 5,993,088 | A | | 11/1999 | Nogay et al. |
| 6,025,925 | A | | 2/2000 | Davidson, Jr. et al. |
| 6,175,839 | B1 | * | 1/2001 | Takao et al. ................. 715/500 |
| 6,317,848 | B1 | | 11/2001 | Sorens et al. |
| 6,476,927 | B1 | * | 11/2002 | Schwarz, Jr. ............... 358/1.15 |
| 6,618,566 | B1 | * | 9/2003 | Kujirai et al. ................. 399/79 |
| 6,665,672 | B1 | * | 12/2003 | Myers et al. .................. 707/10 |
| 6,952,780 | B1 | * | 10/2005 | Olsen et al. ................... 726/26 |
| 2002/0078160 | A1 | * | 6/2002 | Kemp et al. ................. 709/208 |
| 2003/0090705 | A1 | * | 5/2003 | Ferlitsch ..................... 358/1.15 |
| 2003/0093670 | A1 | * | 5/2003 | Matsubayashi et al. ..... 713/168 |
| 2003/0140315 | A1 | * | 7/2003 | Blumberg et al. .......... 715/527 |
| 2003/0160997 | A1 | * | 8/2003 | Kimura ....................... 358/1.15 |

OTHER PUBLICATIONS

Hess, Robert, "A Sense of Identity", Jul. 23, 2001, pp. 1-4.
Hess, Robert, "A Quick Introduction to Hailstorm", May 14, 2001, pp. 1-3.

* cited by examiner

*Primary Examiner*—Kimberly Williams
*Assistant Examiner*—Dillon Murphy (57) ABSTRACT

Disclosed are systems and methods for tracking a user's utilization of print resources. In one embodiment, the system and method pertain to collecting data about a print job from devices in a print pipeline, and storing the data in a central database. In some embodiments, data about the print job is sent to a print accounting service by the devices in the pipeline. In other embodiments, data is obtained by a print accounting service by polling the devices in the pipeline.

12 Claims, 8 Drawing Sheets

SYSTEM AND METHOD FOR TRACKING PRINT SYSTEM UTILIZATION

FIELD OF THE INVENTION

The present disclosure relates to a system and method for gathering print system utilization data. More particularly, the disclosure relates to a computing system and method for collecting data about the utilization of print resources by a user.

BACKGROUND

As the use of computing in modern enterprises has grown, the need for management of computing resources has also grown. In an effort to account for and control costs, organizations have realized they must collect detailed data on the utilization of computing resources throughout the enterprise.

Printers and other output devices present a particularly difficult data collection problem. Large numbers of users located across an enterprise network may send output jobs throughout the organization, through various pipelines, complicating utilization tracking. This information is particularly relevant given the large amounts an enterprise may spend on purchasing and maintaining printer and output hardware, in addition to paper and other supplies.

Current methods for collecting utilization data for printers and other output devices are inefficient. Frequently, data about print jobs are stored on separate devices, if they are stored at all. One existing method involves collecting data using the printer driver software on the personal computer initiating the print job. While the device may accumulate information about a print job's file size, user name, and processor time, information about the job often is incomplete since it does not include data from the printer, such as number of pages printed, number of lost pages, or amount of toner used.

Furthermore, as a user moves around an enterprise using different devices to initiate output jobs, the enterprise may wish to track how much the user prints to a particular device or how much paper is used or misused in the process, regardless of which device initiates the output job. Currently, gathering and analyzing such data can be prohibitively difficult since existing solutions store the information within multiple devices.

Ultimately, in view of the above, it can be appreciated that it would be desirable to have the ability to accurately account for a user's print utilization throughout an enterprise in a centralized fashion.

SUMMARY

The present disclosure relates to systems and methods for tracking a user's utilization of print resources. In one embodiment, the system and method pertain to collecting data about a print job from devices in a print pipeline, and storing the data in a central database. In some embodiments, data about the print job is sent to a print accounting service by the devices in the pipeline. In other embodiments, data is obtained by a print accounting service by polling the devices in the pipeline.

DETAILED DESCRIPTION

As noted above, it is currently prohibitively difficult to track a user's utilization of print resources in a centralized manner. As is described in greater detail below, an identity-based service that can track a user's print jobs would allow an organization, such as an enterprise, to account for the use of resources and effectively budget for new hardware and supplies. Such a service can offload the tracking of print jobs from the print hardware and other devices, and instead concentrate the tracking data and processing within a central system.

Disclosed in the following are systems and methods for tracking a user's utilization of print resources. Although specific systems and methods are described in detail, it will be appreciated that they are embodiments provided for the purposes of illustration only and that various modifications are feasible.

Figure 1:
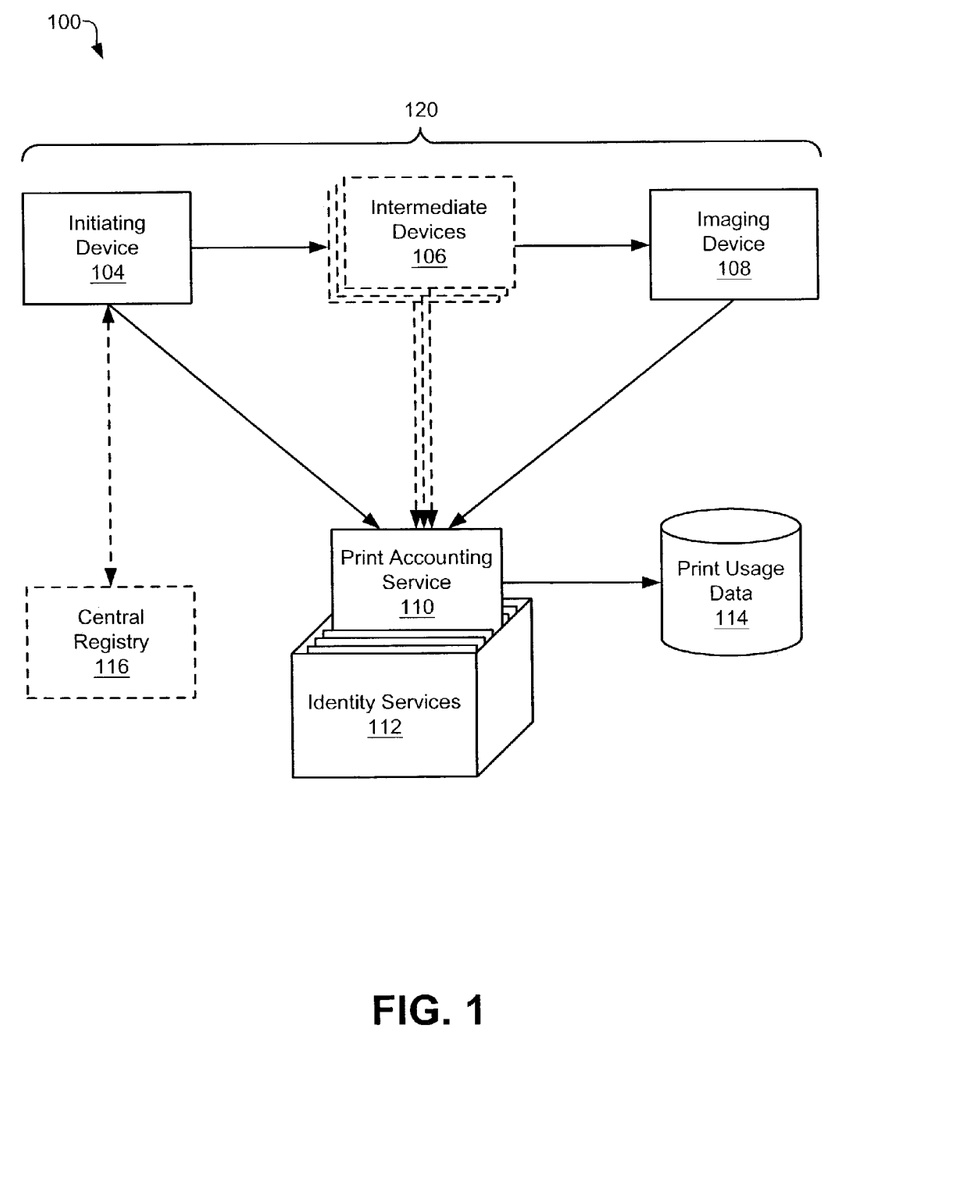
FIG. 1 is a block diagram of an embodiment of a system that tracks a user's print utilization.

Referring now in more detail to the drawings, in which like numerals indicate corresponding parts throughout the several views, FIG. 1 is a block diagram representing a print utilization tracking system 100. As shown in the figure, a print job traverses a network via a print pipeline 120 beginning at an initiating device 104, optionally passing through intermediate devices 106, and finally being output by an imaging device 108. A user that has initiated the print job is associated with a print accounting service 110, which may form part of a larger group of identity services 112. Optionally, the initiating device 104 may communicate with a central registry 116 in order to locate the user's print accounting service 110. As a print job traverses the print pipeline 120, devices in the pipeline (i.e., pipeline devices) communicate with the print accounting service 110, providing print job data that is then stored in a database of usage data 114.

The initiating device 104 comprises any one of a number of devices that initiate a print job. Such a device may be, for example, a personal computer printing a word processing document, or a personal digital assistant (PDA) with wireless access to a network printing a business card. The initiating device 104 also may be a server that automatically sends reports to be printed on a periodic basis, or any one of a number of other devices that initiate print jobs. At minimum, the initiating device 104 comprises programming that can initiate a print job and also communicate with the print accounting service 110, and optionally the central registry 116. The initiating device 104 provides data to the print accounting service 110 that might include, for example, the identity of the user, file size, start time, number of pages, print media selected, etc. The initiating device 104 can also append information about the user and a print accounting service 110 to the header of a print job so that subsequent devices in the print pipeline 120 can share data about the user's print job with the service.

Once a print job has been sent by the initiating device 104, the job may next encounter an intermediate device 106 or the imaging device 108. The intermediate devices 106 may comprise, for instance, a dedicated print server or print spooler, or a transformation server that can transform print jobs into a print-ready format such as PostScript® or printer control language (PCL) Therefore, these intermediate devices 106 neither initiate nor complete a print job, but instead relay a print job and possibly modify its contents en route to the imaging device 108. The intermediate devices 106 have the ability to read the print job header and communicate with the print accounting service 110, providing data about the status of the print job to the service. If the intermediate devices 106 lack this ability, the print accounting service 110 may poll the intermediate devices to retrieve this data. This alternative presumes that the print pipeline 120 for a print job is known by the print accounting service 110.

Once a print job reaches the end of a print pipeline 120 after traveling from an initiating device 104 and optionally through intermediate devices 106, the print job is output by the imaging device 108. The imaging device 108 identified in FIG. 1 is not limited to conventional paper printers, but instead may comprise any devices which produce a hard output including, for example, laser printers, inkjet printers, slide printers, fax machines, multi-function peripheral (MFP) devices, and all-in-one devices.

The imaging device 108, having read the user and service information from the print job header, communicates with the print accounting service 110 to provide data about the print job including, for example, the user identity, the number of pages printed, number of pages misfed, amount of toner used, print media used, etc. Alternatively, the print accounting service 110 polls the imaging device 108 for this information if the printer cannot initiate the communication. This alternative again assumes that the imaging device pipeline 120 is known by the print accounting service 110.

The print accounting service 110 may take one of several forms. In one arrangement, the service 110 is part of a larger suite of identity services 112 and provides services and information for applications based on a user's identity. One example identity service is Microsoft Hailstorm™, and more particularly, My Services™ of Microsoft Hailstorm™. HailStorm™, like other available identity services, is a Web-based service for storing and retrieving information. More particularly, HailStorm™ is designed to manage information particular to given individuals so that a user's information is specifically stored for that user. With this functionality, Hailstorm™ and another such identity services may be used to, for instance, permit a travelling user to check his or her calendar to see what meetings are planned for the day by logging into the user's Web-based calendar using an Internet terminal. To cite another example, an employee can, using an application designed to help employees schedule a ride-share system that the employer uses to encourage carpooling, coordinate the employee's schedule with those of the other employees in a carpool.

As can be appreciated from the above examples, one goal of such identity services is to retain information in a user-centric architecture, as opposed to an application-centric or device-centric architecture. The shift to a user-centric design provides greater control to the user over his or her information, while at the same time providing the user with the flexibility and freedom to utilize this information in new ways. Therefore, such identity services provide a single data storage infrastructure that enables use across multiple applications, users, and even operating systems. Although the above examples are focused on scheduling and user calendars, other use applications include things like an inbox, contacts, profile, addresses, and application settings. By binding all of these together and providing a unique and secure key for accessing this information, the identity service provides a mechanism through which users can manage their data, and through which applications can request permission to interoperate with this data. By providing a base set of general purpose data stores, identity services allow applications to be designed that enable deeper, richer, and more unique capabilities.

HailStorm™ is built on top of .NET and provides fundamental resources that a Web-based distributed application may need to share information between applications. In such an implementation, .NET acts as a file system. The file system itself has no control or interest in the meaning or the format of the data stored in a file, and there is nothing that ensures that the data will be understandable or even readable by the second application. HailStorm™, however, may be used as ASCII text so that text information can be shared between two applications, comma separated value (CSV) files, or rich text format (RTF) files. Through these and other data interchange methods, it is possible for users to store their information in a commonly understood format, and for multiple applications to share and expose this information in order to interact with other applications, as well as aggregate the information into unique and useful views.

Although implementation through an identity service is preferred, the print accounting service 110 alternatively may comprise an independent program (software and/or firmware) stored on a server which uses one of many network protocols to communicate with devices in the print pipeline 120. These protocols can include platform-independent standards such as hypertext transfer protocol (HTTP), or may involve direct software calls depending on the operating systems and applications involved. The print accounting service 110 is capable of receiving information about a user's print job and storing this information with the usage data 114. Additionally, the print accounting service 110, optionally in conjunction with the identity services 112, allows or denies a user's print job depending on the user's identity and authorization as determined by an administrator.

Figure 2:
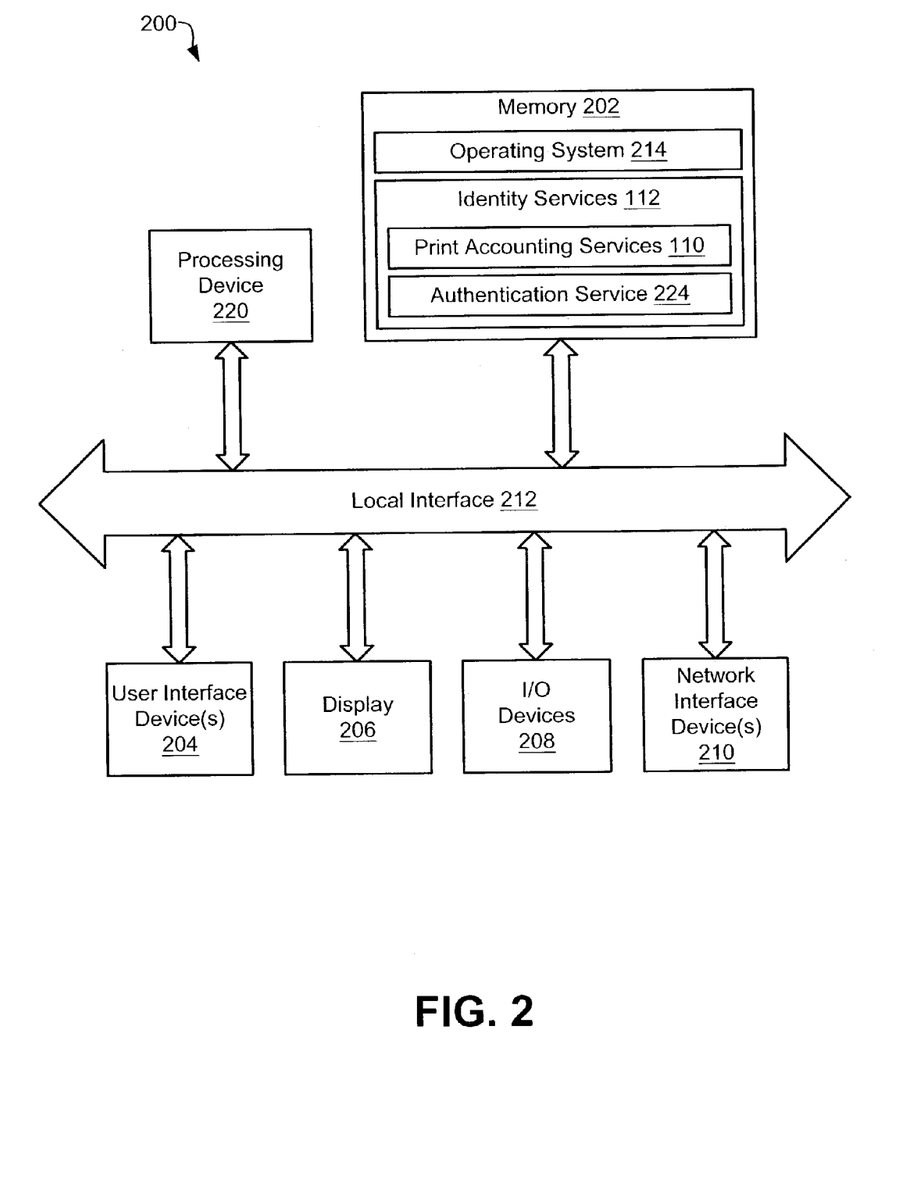
FIG. 2 is a block diagram of an embodiment of a computing device used to track print jobs.

The print accounting service 110 is further explained in FIG. 2, which presents a block diagram representing an example architecture for a computing device 200 containing the identity services 112. It is again noted that the arrangement indicated in FIG. 2 reflects one possible embodiment, and that other architectures, distributed or otherwise, are possible. The computing device 200 can be any one of a wide variety of conventional computing devices, such as desktop computers, dedicated server computers, multi-processor computing devices, etc. Irrespective its type, the computing device 200 typically comprises a processing device 220, memory 202, one or more user interface devices 204, a display 206, one or more input/output (I/O) devices 208, and one or more networking devices 210, each of which is connected to a local interface 212.

The processing device 220 can include any custom made or commercially available processor, a central processing unit (CPU) or an auxiliary processor among several processors associated with the computing device 200, a semiconductor based microprocessor, a macroprocessor, one or more application-specific integrated circuits (ASICs), a plurality of suitably configured digital logic gates, and other well known electrical configurations to coordinate the overall operation of the computing device 200. The memory 202 can include any one of a combination of volatile memory elements (e.g., random access memory (DRAM, SDRAM, etc.)) and nonvolatile memory elements (e.g., ROM, hard drive, Flash RAM, etc.).

The one or more user interface devices 204 comprise those components with which the user can interact with the computing device 200. For example, where the computing device 200 comprises a dedicated server, these components can comprise a keyboard and mouse. The display 206 can comprise a computer monitor or plasma screen for a dedicated server and the display may be shared among multiple servers.

With further reference to FIG. 2, the one or more I/O devices 208 are adapted to facilitate connection of the computing device 200 to another device and may include one or more serial, parallel, small computer system interface (SCSI), universal serial bus (USB), IEEE 1394 (e.g., Firewire™), and/or personal area network (e.g., Bluetooth™) components. The network interface devices 210 comprise the various components used to transmit and/or receive data over a network. By way of example, the network interface devices 210 include a device that can communicate both inputs and outputs, for instance, a modulator/demodulator (e.g., modem), wireless (e.g., radio frequency) transceiver, a telephonic interface, a bridge, a router, network card, etc.

The memory 202 normally comprises an operating system 214 and programs that manage the identity services 112, the print accounting service 110, and optionally an authentication manager 224. The operating system 214 controls the execution of other programming and provides scheduling, input-output control, file and data management, memory management, communication control, and related services. As noted above, the print accounting service 110, in conjunction with the identity services 112 and optionally with the authentication manager 224, receives and stores data about a print job sent from the initiating device 104 and/or from the other devices in the print pipeline 120. Alternatively, the print accounting service 110 may poll the devices of the print pipeline 120 to gather print job data from the devices in the print pipeline 120, assuming the pipeline is known by the service 110.

Figure 3:
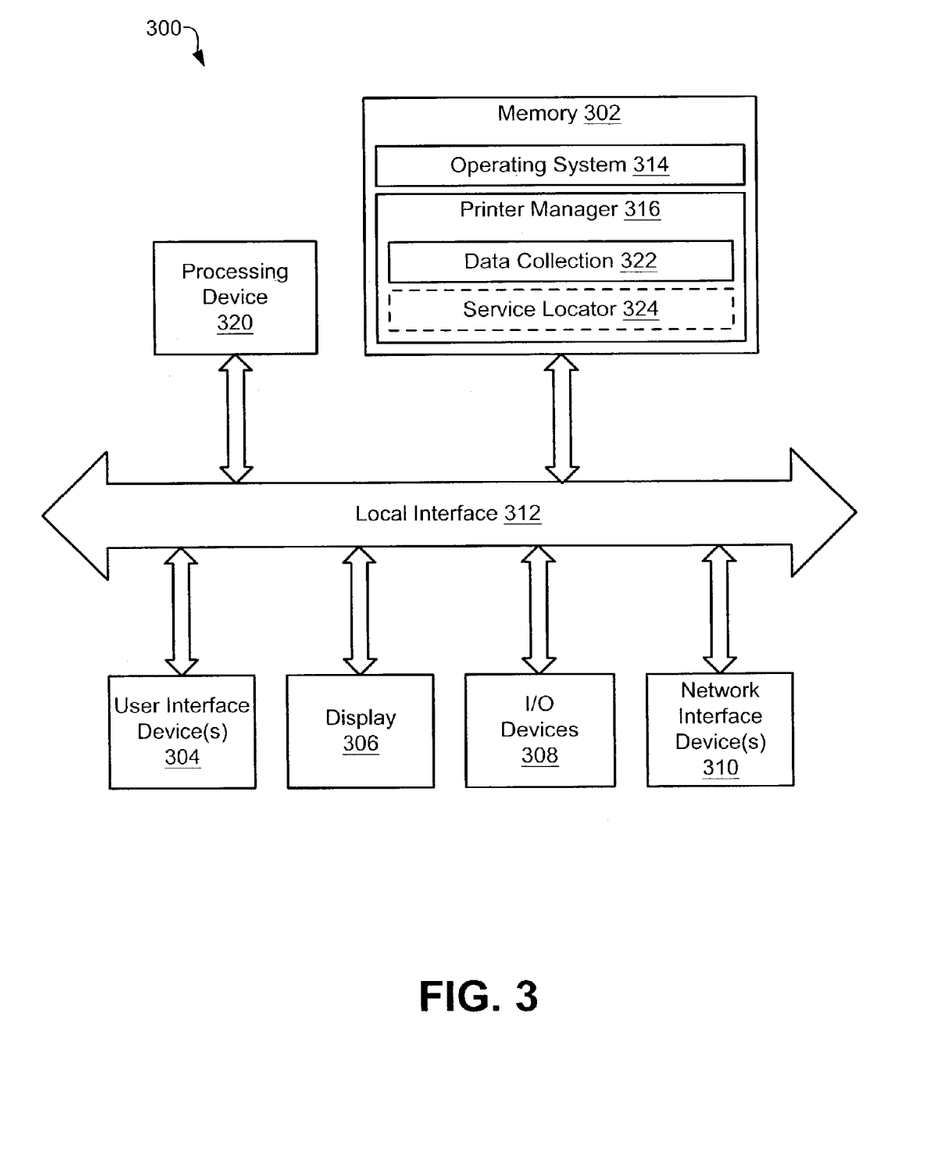
FIG. 3 is a block diagram of an embodiment of a computing device used to initiate, process, route, print, or otherwise handle a print job.

FIG. 3 is a block diagram of an example arrangement of a computing device 300 can comprise any of the devices in the print pipeline 120 shown in FIG. 1 including the initiating device 104, the intermediate devices 106, and the imaging device 108. As indicated in FIG. 3, the computing device 300 can, for instance, comprise a processing device 320, memory 302, one or more user interface devices 304, a display 306, one or more I/O devices 308, and one or more network interface devices 310, each of which is connected to a local interface 312. The processing device 320 can include any custom made or commercially available processor, a central processing unit (CPU) or an auxiliary processor among several processors associated with the computing device 300, a semiconductor based microprocessor, or a macroprocessor. The memory 302 can include any one of a combination of volatile memory elements (e.g., random access memory (DRAM, SDRAM, etc.)) and non-volatile memory elements (e.g., ROM, hard drive, Flash RAM, etc.).

The one or more user interface devices 304 comprise the components with which a user can interact with a computing device 300. Where the computing device 300 is a notebook personal computer, a desktop personal computer, a dedicated server computer, a personal digital assistant (PDA) or a handheld computer, these components may comprise a keyboard, a mouse, a touch screen with handwriting recognition, or a microphone with voice recognition capabilities, or any other such input device. Where the computing device 300 is an imaging device, these components might comprise menu buttons used in conjunction with a liquid crystal display (LCD).

The display 306 can take various forms depending on the type of the computing device 300. Where the computing device 300 is a personal computer, a server, or a handheld device of some sort, the display 306 can comprise a computer monitor, a flat panel screen or a liquid crystal display (LCD). Where the computing device 300 is an imaging device, the display 306 can comprise a liquid crystal display (LCD), or indicator lights.

The one or more I/O devices 308 can comprise components used to facilitate connection of the computing device 300 to other devices and can comprise one or more serial, parallel, small computer system interface (SCSI), universal serial bus (USB), IEEE 1394 (e.g., Firewire™), and/or personal area network (e.g., Bluetooth™) components. The network interface devices 310 comprise the various components used to transmit and/or receive data over a network of computing devices. By way of example, the network interface devices 210 include a device that can communicate both inputs and outputs, for instance, a modulator/demodulator (e.g., modem), wireless (e.g., radio frequency) transceiver, a telephonic interface, a bridge, a router, network card, etc.

The memory 302 normally comprises various programs in software and/or firmware including an operating system 314 and a print manager 316. The operating system 314 typically controls the execution of other software and provides scheduling, input-output control, file and data management, memory management, communication control, and related services. The print manager 316 may take various forms depending on where the computing device 300 is located within the print pipeline 120. Where the computing device 300 is an initiating device 104, the print manager 316 may comprise a print driver that initiates a print job. The print driver contains data collection code 322 to collect data about a print job and communicate that data to a print accounting service 110. Additionally, the print driver may contain service locator code 324 that locates a user's identity services 112 or print accounting service 110. Where the computing device 300 is an intermediate device 106, the print manager 316 may comprise print spooling code or transformation code. This code is configured to collect data about print jobs in the pipeline and communicate that data to a print accounting service 110. Finally, where the computing device 300 is an imaging device, the print manager 316 controls the actual production of print jobs and also can collect and communicate data about the output job to a print accounting service 110.

A variety of programs have been identified above. It is to be understood that the programs can be stored on any computer-readable medium for use by or in connection with any computer related system or method. In the context of this document, a computer-readable medium is an electronic, magnetic optical or other physical device or means that can contain or store code (e.g., in the form of a computer program) for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus or device and execute the instructions. The term "computer-readable medium" can be any means that can store, communicate, propagate, or transport the programs for use by or in connection with the instruction execution system, apparatus, or device.

The computer-readable medium can be, for example but not limited to, an electronic, magnetic, optical, electromagnetic, infrared or semiconductor system, apparatus, device, or propagation medium. More specific examples (a non-exhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium up which a program is printed, as the program can be electronically captured, via for instance optical scanning of the paper or other medium, then compiled, interpreted or otherwise processed in a suitable manner if necessary, and then stored in a computer memory.

Example systems having been described above, examples of operation of the systems will now be discussed. In the discussions that follow, flow diagrams are provided. It is to be understood that any process steps or blocks in these flow diagrams may represent modules, segments, or portions of code that include one or more executable instructions for implementing specific logical functions or steps in the process. It will be appreciated that, although particular example steps are described, alternative implementations are feasible. Moreover, steps may be executed out of order from that shown or discussed, including substantially concurrently or in reverse order, depending on the functionality involved.

Figure 4A:
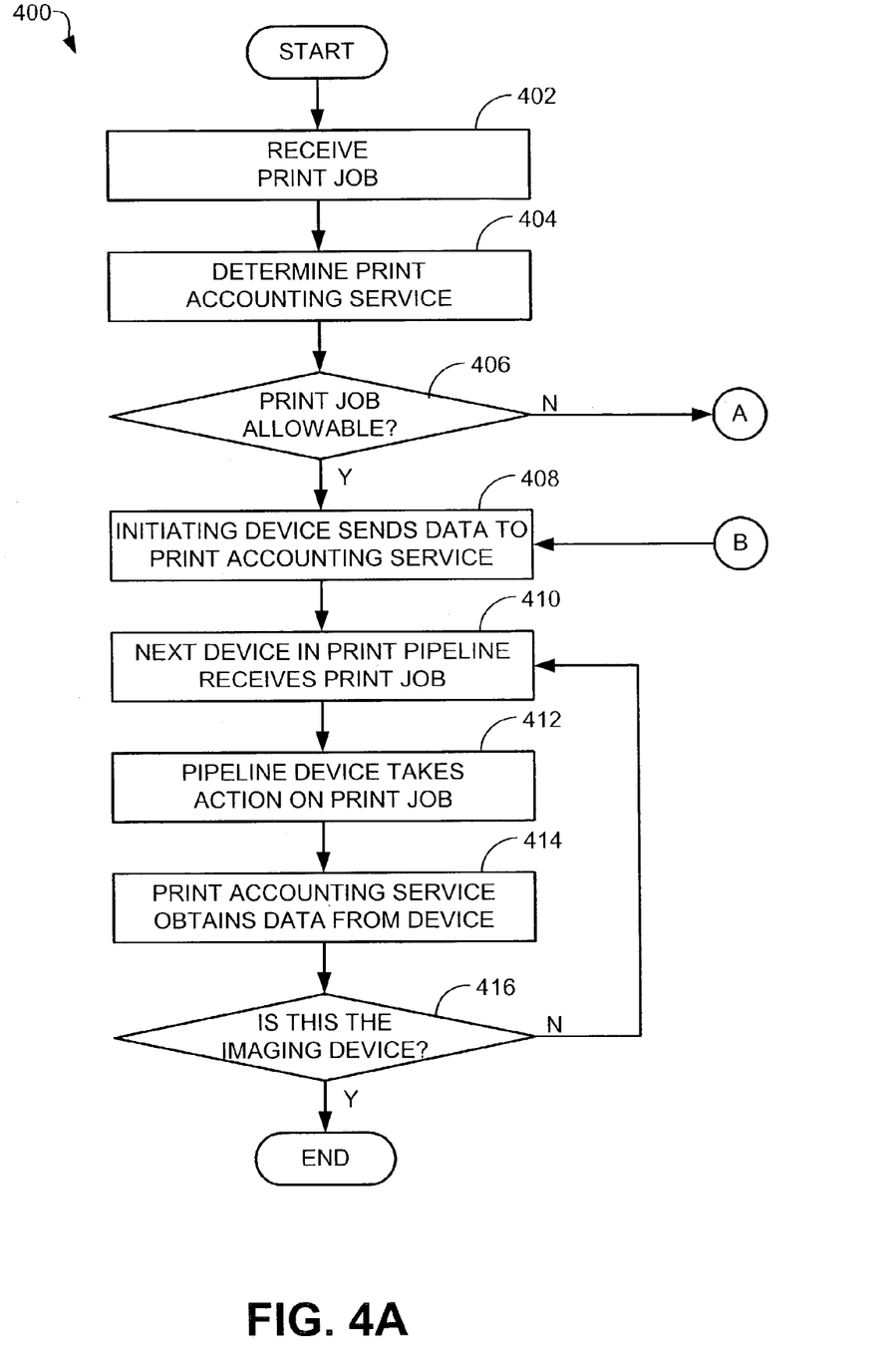
FIG. 4 is a flow diagram that illustrates an embodiment of operation of the system shown in FIG. 1 in tracking a user's utilization of print services.

As noted above, it would be desirable to centrally collect data about a user's utilization of print resources, particularly in an enterprise context. The above-described systems facilitate this goal by sharing information about a user's print jobs throughout the print pipeline with a centralized service that maintains a database for future analysis. FIG. 4 provides an overview of such a method 400. Beginning with block 402 of this figure, the initiating device 104 receives a print job, for example from an individual user or from a scheduled process. The output to be printed might be a word processing document, a web page, a slide, a photograph, or any other type of printable document.

Figure 4B:
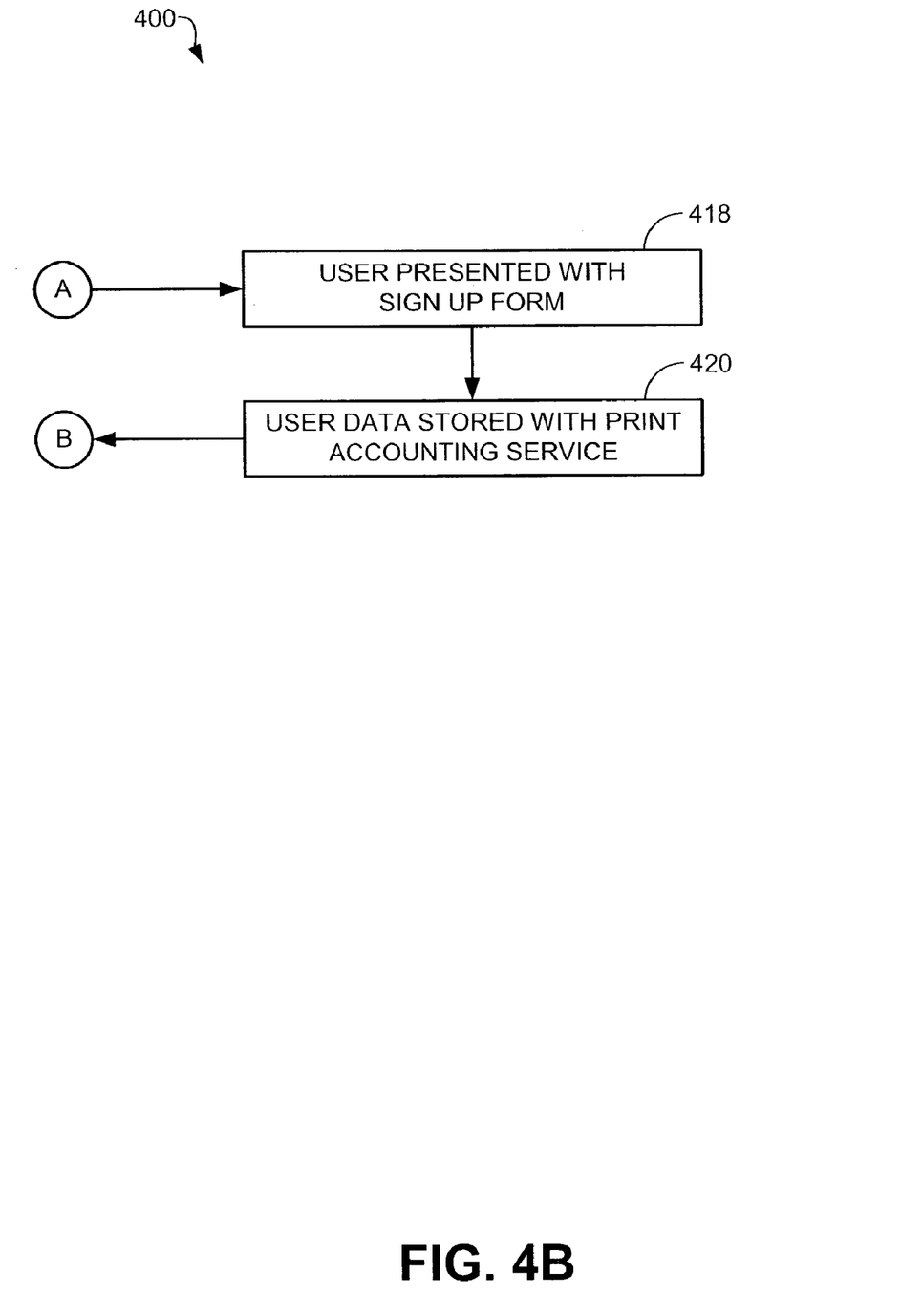

Once the print job has been received, the print driver in the initiating device 104 determines the location of the user's print accounting service 110, as shown in block 404. There are several ways that the print accounting service 110 may be determined. For instance, the user can provide the location of the service 110, or the printer driver can look up the user's service by communicating with a central registry 116 or some other look-up mechanism. In some cases, the initiating device 104 may require that a specific print accounting service be used. Once the service 110 is determined, the initiating device 104 makes a request of the service 110 as to whether the particular user is allowed to print, as shown in decision block 406. The service 110 will either affirm the user's privileges, or in the alternative, it may optionally present an individual with a form to register the user with the service, as in block 418 (FIG. 4B), for example using a web page to display the form. In such a situation, once an individual has successfully registered with the service 110, the individual's registration data is stored with the print accounting service, as shown in block 420, and the print job is approved. In a third alternative, print jobs are automatically sent to the service and there is no need for the print accounting service 110 to approve the job.

Once the print job has been approved by the print accounting service 110, the initiating device 104 sends the initial batch of data about the job to the print accounting service 110 before releasing the job to the next device in the print pipeline 120, as shown in block 408. The data sent in this step may include any information about the print job or the initiating device, for example, the user identity, the file size, number of pages, start time, processing time, selected media, etc. Additionally, the initiating device 104 appends the user's identifying information and the location of the print accounting service 110 to the header of the print job for use by other pipeline devices.

With reference to block 410, the next device in the pipeline 120 (i.e., pipeline device) receives the print job and, with reference to block 412, takes some action on the print job. For instance, where the next device is an intermediate device 106, this action may comprise queuing the job, transforming it into print-ready format, etc. Where the next device is the imaging device 108, the action comprises generating one or more hardcopy documents. Next, as indicated in block 414, the print accounting service 110 obtains data from the pipeline device. In particular, the pipeline device contacts the print accounting service 110 with data about the print job, or in the alternative, the print accounting service polls the individual pipeline devices to collect the data. The latter case assumes that the print accounting service 110 knows the route that the print job will take. Where the device is an intermediate device 106, the data sent or received about the job might include, for instance, user identity, job status, file size, wait time, or processing time if there is a transformation of the print job occurring on the intermediate device. Where the device is the imaging device 108, this data might include, for example, the user identity, the number of pages printed, number of pages misfed, amount of toner used, print media used, etc.

At this point, as shown in decision block 416, if the pipeline device is the imaging device 108 at the end of the pipeline 120, then the flow is complete. However, if the device is an intermediate device 106, for example a print server or spooler, then once the job data has been sent or gathered, then the next pipeline device receives the job, repeating the sequence from block 410.

Figure 5:
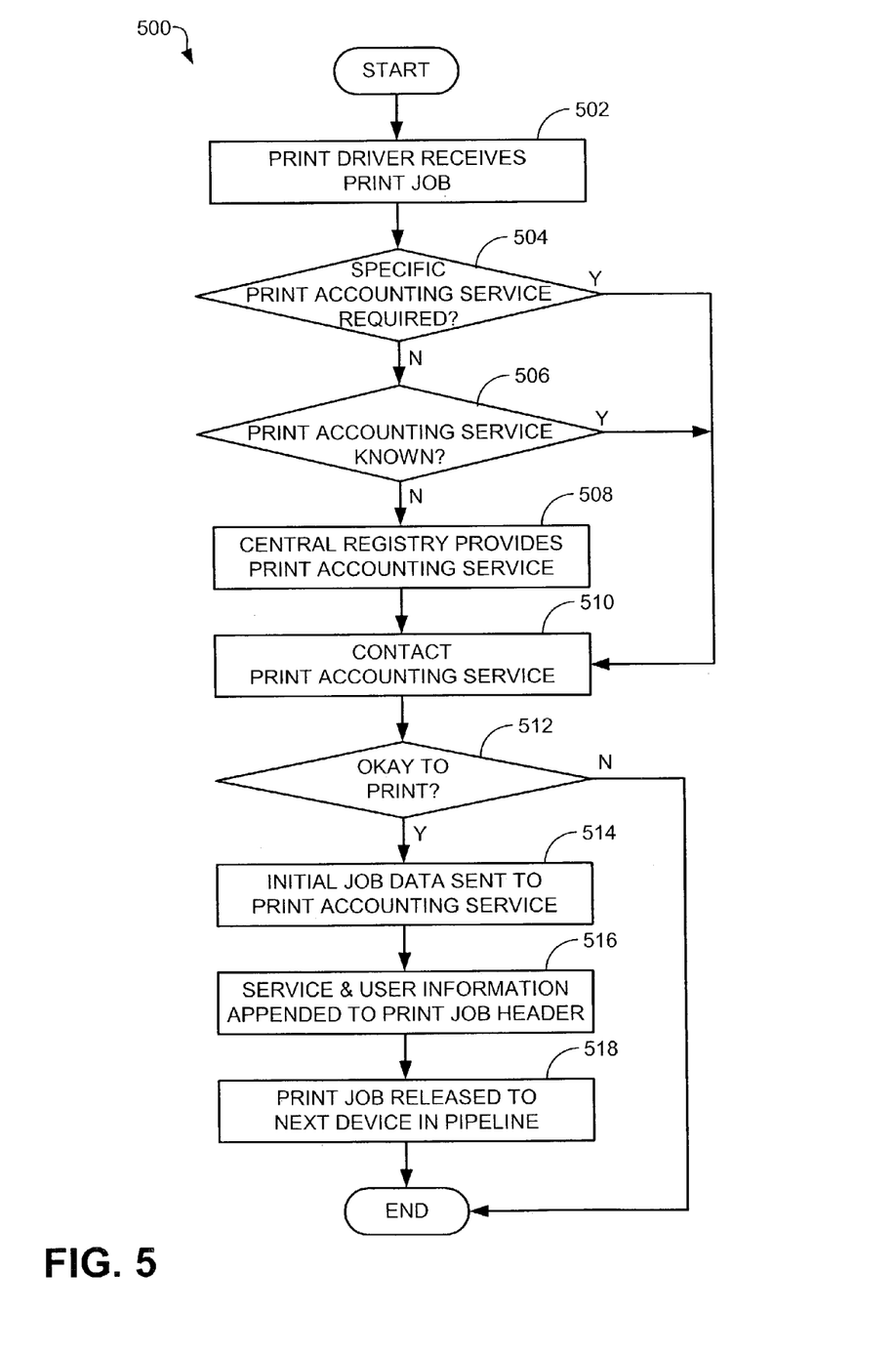
FIG. 5 is a flow diagram that illustrates an embodiment of a print manager shown in FIG. 3 in initiating device from FIG. 1.

FIG. 5 illustrates an example method 500 practiced by the initiating device 104 when it initially receives a print job. Beginning with block 502, the print driver of the initiating device 104 receives a print job. Next, as shown in decision block 504, if the initiating device 104 is required to use a particular print accounting service 110, then execution moves on to block 510, where the service is provided with the user's information as well as information on the print destination. This information can be communicated in one of several ways. For example, the communication an comprise a direct software call between systems, or via a web protocol such as hypertext transfer protocol (HTTP). Optionally, this communication may occur using a third party authentication server, such as Verisign®, to ensure that the print accounting service 110 is a trusted server that will actually account for the user's print job.

Returning to the decision block 504, if a specific print accounting service is not required by the initiating device 104, then the user may be prompted to identify his or her print accounting service. With reference to decision block 506, if the user has this information, then execution can continue on to block 510. If not, however, then the initiating device 104 may look up the user's print accounting service 110 via the central registry 116, as shown in block 508. This registry 116 may be a remote database, or a lightweight directory access protocol (LDAP) server that is able to match a user with the user's print accounting service 110. The print accounting service 110 is provided with information about the user and the destination printer 108, and the initiating device 104 waits for a determination of whether the print job may proceed.

As shown in decision block 512, if the print accounting service 110 determines that the user is permitted to print, then the initiating device 104 proceeds with the print job. Otherwise, the print job is rejected, and the user is notified as to the rejection. Once the job has been approved, as shown in block 514, the initiating device 104 provides the print accounting service 110 with initial data about the print job. Next, in block 516, the initiating device 104 appends identifying information about the user and the print accounting service 110 to the print job header so that subsequent devices in the print pipeline 120 will be able share data about the job with the service. Finally, in block 518, the initiating device 104 releases the print job to the next device in the print pipeline 120.

Figure 6:
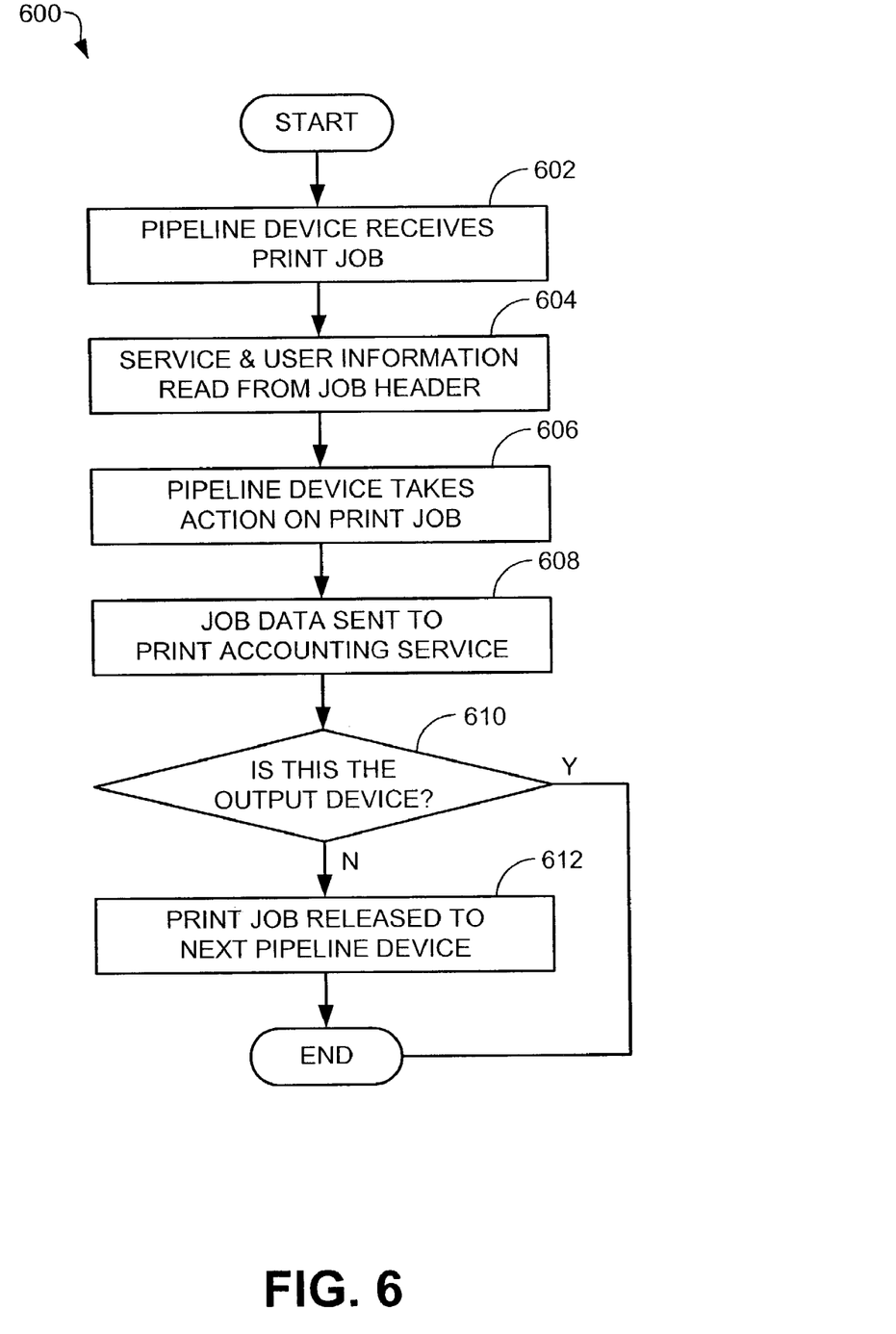
FIG. 6 is a flow diagram that illustrates an embodiment of a print manager shown in FIG. 3 operating in an intermediate device or printer from FIG. 1.

FIG. 6 illustrates an example method 600 practiced by a pipeline device other than the initiating device (104) (i.e., an intermediate device 106 or the imaging device 108). As shown in block 602, the pipeline device first receives the print job. Next, in block 604, identifying information about the user and print accounting service 110 are read from the job header. Then the pipeline device takes action on the print job, as shown in block 606, meaning that the job is queued and transformed to print-ready format or printed, depending on the function of the device in the pipeline 120. Next, the device passes information about the user's job to the print accounting service 110, as in block 608. At this point, with reference to decision block 610, if the pipeline device is the imaging device 108, then the process for this print job is complete. If it is not the imaging device 108, then the print job is released to the next device in the pipeline 120, as shown in block 612.

Figure 7:
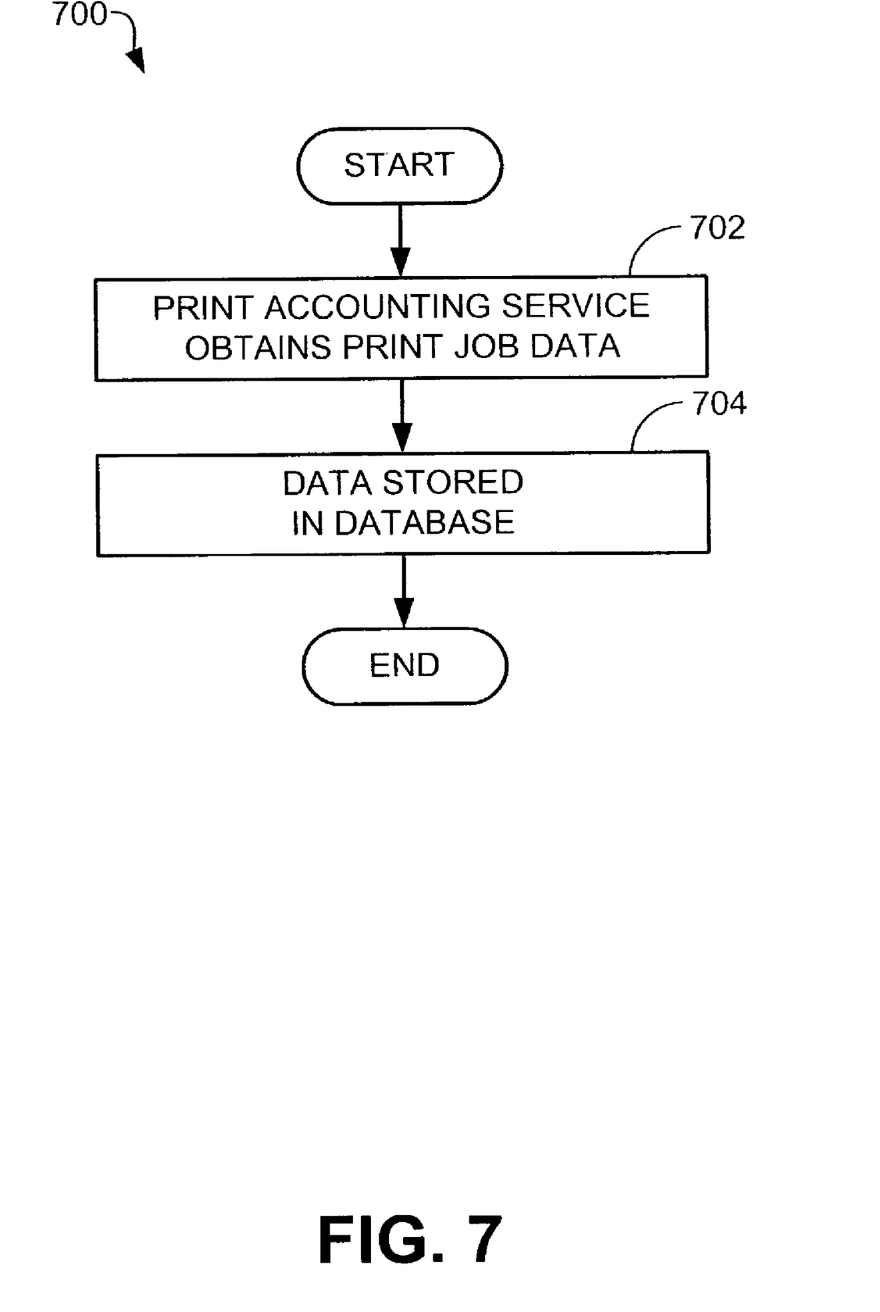
FIG. 7 is a flow diagram that illustrates an embodiment of operation of a print accounting service shown in FIG. 3 in ongoing tracking of a print job.

FIG. 7 illustrates an example method 700 practiced by the print accounting service 110 when it receives data about a print job from a device in the print pipeline 120. When presented with print job data from the pipeline device (702), the print accounting service 110 stores the data along with other usage data about the print job in a database 114 (704). This data can be used by an organization to both track and plan for the utilization of print resources. For example, a business can track employees who may abuse their use of a printer, or a company may be able to track the number of pages produced for a particular client. Additionally, an organization can track the use of a particular printer and schedule maintenance and supply purchases accordingly. As can be appreciated from the above, there are nearly an unlimited number of uses for which an organization can use the information stored in the database by the print accounting service.

While particular embodiments have been disclosed in detail in the foregoing description and drawings for purposes of example, it will be understood by those skilled in the art that variations and modifications thereof can be made without departing from the scope of the invention as set forth in the following claims.

What is claimed is:

1. A method performed by a given pipeline device that forms part of a print pipeline traversed by a print job for tracking print resource utilization by a user, the method comprising:
the pipeline device first receiving the print job from an intermediate device in the print pipeline that received the print job from an initiating device that initiated the print job;
the pipeline device next receiving information regarding the location of a print accounting service for the user that initiated the print job; and
the pipeline device then sending data about the print job to the print accounting service.

2. The method of claim 1, wherein sending data comprises sending information from a print server as to at least one of user identity, job status, file size, wait time, and processing time.

3. The method of claim 1, wherein sending data comprises sending information from a printer as to at least one of user identity, the number of pages printed, number of pages misfed, amount of toner used, and print media used.

4. The method of claim 1, wherein sending data comprises sending information to a print accounting service of an identity service.

5. A method comprising:
gathering data on an initiating device about a print job initiated by the user;
determining on the initiating device the location of a user print accounting service that executes on a device separate from a print pipeline to be traversed by the print job;
sending the gathered data from the initiating device to the user print accounting service;
sending the print job from the initiating device to a pipeline device;
collecting on the pipeline device data concerning processing of the print job by the pipeline device;
sending the collected data from the pipeline device to the user print accounting service; and
storing the gathered and collected data in a database of the print accounting service such that the gathered and collected data is stored in a central location and relative to the user.

6. The method of claim 5, wherein gathering data comprises gathering data about at least one of an identity of the user, file size, start time, number of pages, and print media selected.

7. The method of claim 5, wherein the pipeline device comprises a print server or a printer.

8. The method of claim 5, wherein collecting data comprises collecting data about at least one of user identity, job status, file size, wait time, processing time, number of pages printed, number of pages misfed, amount of toner used, and print media used to print the print job.

9. The method of claim 5, further comprising sending an identity of the user and the location of the user print accounting service from the initiating device to the pipeline device.

10. The method of claim 9, wherein the identity of the user and the user print accounting service location are sent to the pipeline device within a header of the print job.

11. The method of claim 5, further comprising sending the print job from the pipeline device to a further pipeline device, collecting on the further pipeline device data concerning processing of the print job by the further pipeline device, and sending the collected data from the further pipeline device to the user print accounting service.

12. The method of claim 11, wherein the further pipeline device is a printer.

* * * * *